B. F. AUGUSTINE.
SHAFT COUPLING.
APPLICATION FILED JULY 24, 1916.

1,242,906.

Patented Oct. 16, 1917.
2 SHEETS—SHEET 1.

Inventor
Benjamin F. Augustine

By
Attorney

B. F. AUGUSTINE.
SHAFT COUPLING.
APPLICATION FILED JULY 24, 1916.
1,242,906.
Patented Oct. 16, 1917.
2 SHEETS—SHEET 2.
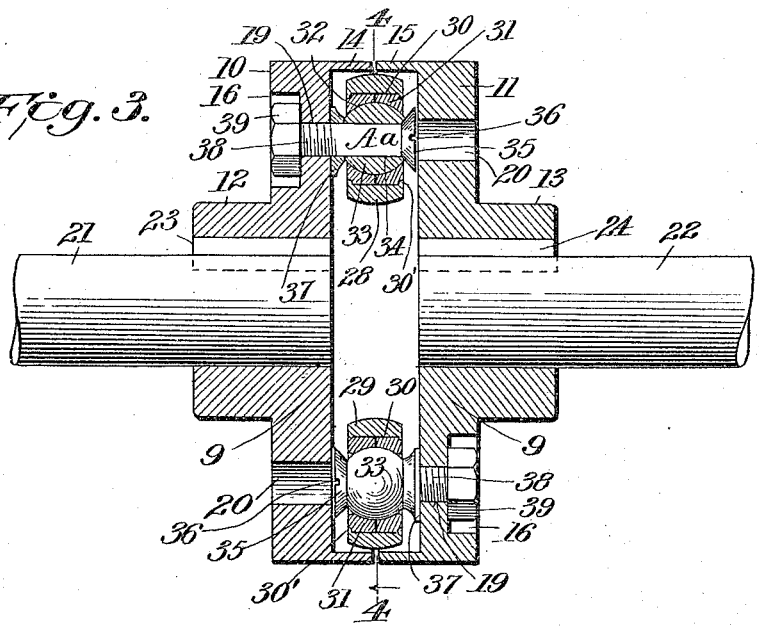
Fig. 3.
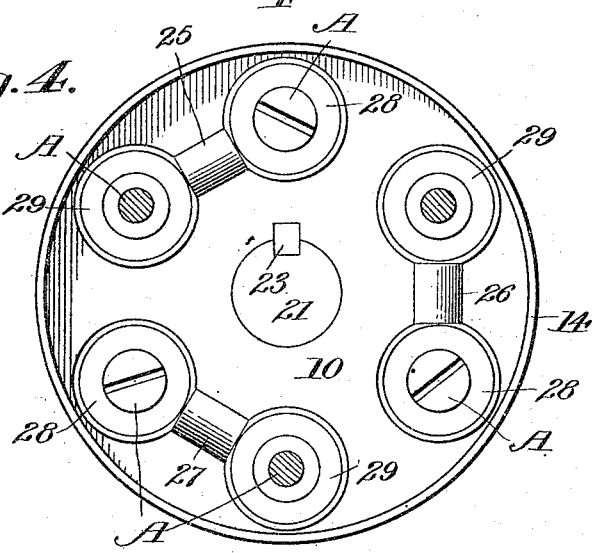
Fig. 4.
Inventor
Benjamin F. Augustine
By 
Attorney

UNITED STATES PATENT OFFICE.

BENJAMIN F. AUGUSTINE, OF BUFFALO, NEW YORK.

SHAFT-COUPLING.

1,242,906.

Specification of Letters Patent.   Patented Oct. 16, 1917.

Application filed July 24, 1916. Serial No. 111,053.

*To all whom it may concern:*

Be it known that I, BENJAMIN F. AUGUSTINE, a citizen of the United States, residing at Buffalo, in the county of Erie and State of New York, have invented certain new and useful Improvements in Shaft-Couplings, of which the following is a specification.

This invention relates to shaft couplings.

One object is to provide a shaft coupling wherein one coupling member is pulled by the other and wherein the pulling connections between the coupling members have universal joint connections with the members and are housed within the latter.

Another object resides in the provision of a shaft coupling, embodying among other characteristics, coupling members constructed so that they may be reversed and either serve as the driving or driven member and wherein the driven member is pulled by the driving member through the instrumentality of suitable positive connections between the members and whose connections with the members are such as to provide for a safety flexible connection that will permit of the coupling shafts running in or slightly out of alinement.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings—

Fig. 3 is a transverse sectional view.

Fig. 4 is a sectional view on the line 4—4 of Fig. 3.

Figure 1:
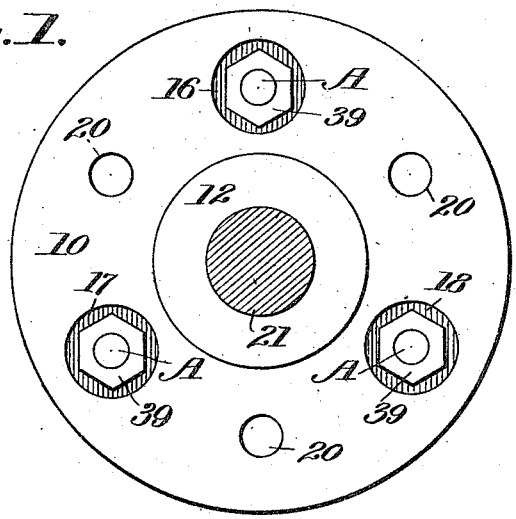
Figure 1 is a view of the outer face of one of the coupling members.
Figure 2:
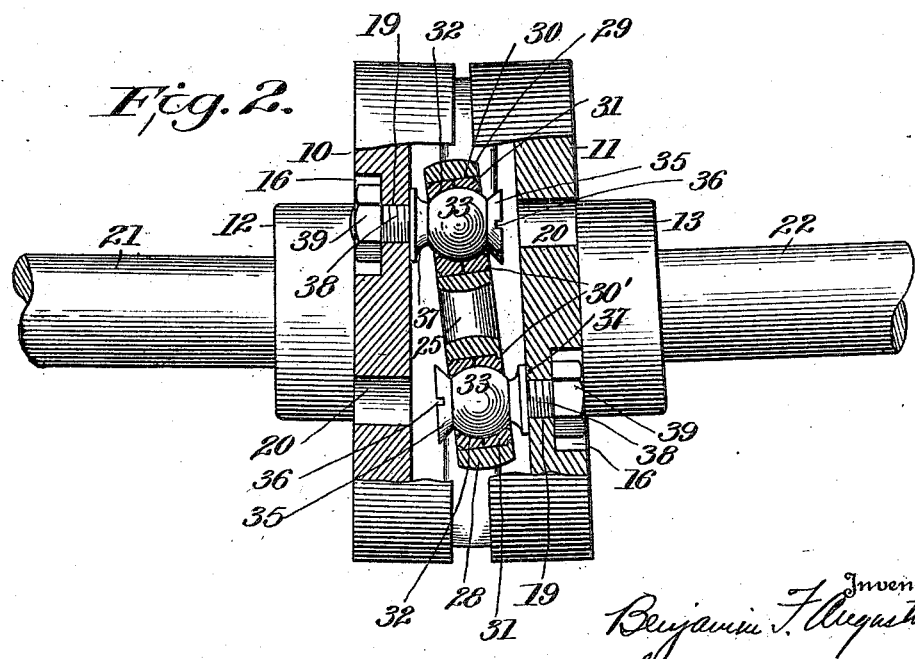
Fig. 2 is a sectional view illustrating the shafts slightly out of alinement.

Referring now more particularly to the accompanying drawings, 10 and 11 indicate coupling members, each formed alike, for reversing purposes. Each member includes a body portion 9, outwardly directed hubs 12 and 13, respectively, and inwardly directed marginal annular flanges 14 and 15, respectively, whereby each coupling member is of cup-formation, designed to have such cooperative relation when the coupling is assembled to provide for the housing, shielding and protection of the operative connections between the coupling members.

Recesses 16, 17 and 18 are formed in equi-distant relation in the outer face of the body 9 of each coupling member. An aperture 19 leads inwardly through the respective member from each of these recesses and these apertures are screw-threaded. Other apertures 20 are formed in equi-distant relation through the body 9 of each coupling member and disposed in circumferential alinement with said recesses and located between the latter.

The coupling members 10 and 11 are fixedly secured to the driving and driven shafts 21 and 22, respectively, by means of suitable keys 23 and 24, respectively.

Pulling links 25, 26 and 27 are connected to the coupling members so that the coupling member 11 may be pulled by the coupling member 10 upon operation of the driving shaft 21. These pulling links are of peculiar formation. As shown, each link is provided with heads 28 and 29 located at the ends of each link. Each head is provided with an aperture 30 in which is fitted a sectional brass or other wear ring 31 provided with an annular internal groove 32 forming a bearing. A ball 33 is movably mounted in the wear ring 31 and is provided with a smooth central bore 34. The wear ring sections are held in place by upsetting the heads 28 and 29 adjacent the apertures 30, as indicated at 30'.

Bolts A pass through the bores 34 of the balls to connect the links to the respective coupling members. Each bolt A has a conical head 35 provided with a recess 36 to take a screw driver. Each bolt is smooth adjacent the conical head 35, as at $a$, and it is this smooth portion of each bolt which takes the bore 34 of the respective ball 33. Each bolt has a cone bearing mounted thereon as shown at 37, adjacent the outer end of the smooth portion $a$ and from the cone bearing each bolt is screw-threaded, as shown at 38.

The bolts A are passed through the balls 33 in the heads of each link in opposite directions, that is to say, a bolt A is passed through the ball 33 in the head 28 of the link 25 with its screw-threaded end screwed into one of the apertures 19 of the coupling member 10. A jam nut 39 is then screwed onto the screw-threaded end of such bolt and located in the recess 16 of the coupling member 10. The ball is journaled on the smooth portion a of the bolt. A cone bearing 37 cooperates with the cone-shaped head 35 of the bolt A to provide bearings for the side surfaces of the balls.

A bolt A is then passed through the ball 33 in the head 29 at the opposite end of the link 25 in a direction opposite to the direction of passage of the bolt previously passed through the ball in the head 28 and having its screw-threaded end screwed into and through the corresponding aperture 19 and into the respective recess 17 of the coupling member 11 and a jam nut applied to the bolt and located in said respective recess, whereby, each link is connected at one end to one coupling member and at its opposite end to the companion coupling member so that rotation of the driving coupling member will produce a pulling action on the driven coupling member.

To disassemble the parts of the coupling or to adjust the bolts with relation to the universal connection, a screw driver or other suitable element (not shown) may be inserted through the openings 20 to engage in the recesses 36 of the respective bolts to turn the bolt and disconnect it from the respective nut 39, or for adjustment purposes, said nuts 39 being held against rotation in any suitable manner during adjustment of the bolts or during disconnection of the bolts from the nuts.

The construction illustrated and described, provides for an efficient flexible coupling and one which may be regarded as a safety coupling in that the driving connections between the coupling members are housed within the coupling members obviating possibility of danger to bystanders in the event of breakage of the pulling connections. It will also be apparent that by virtue of the universal joint connections between the pulling links and the coupling members that the coupling members may readily tilt, relative to each other and provide for an effective connection between the driving and driven shafts in the event that they should assume positions slightly out of alinement.

What I claim is:—

1. A shaft coupling comprising coupling members, each cup-shaped in form and each provided with equi-distant recesses in its outer face with screw-threaded apertures leading inwardly from the recesses and each also having apertures arranged between the aforesaid recesses, links disposed between the coupling members, each having a perforated head, a bored ball rotatably mounted in each head of each link, and bolts passed through the bores of the balls and connecting the ends of each link to opposite coupling members.

2. A shaft coupling comprising cup shaped coupling members, links arranged between said coupling members, a ball rotatably mounted in each end of each link, and adjustable bolts mounted in each coupling member and extending therethrough on which the rotatably mounted balls are journaled, said coupling members having a plurality of apertures through which said bolts are adapted to be adjusted.

3. A shaft coupling comprising cup-shaped coupling members, links arranged between said members, a ball rotatably mounted in each end of each link, a wear ring interposed between each ball and link, and bolts mounted in said coupling members on which said rotatably mounted balls are journaled.

4. A shaft coupling comprising cup-shaped coupling members, links arranged between said members, a ball rotatably mounted in each end of each link, bolts mounted in each coupling member and extending therethrough and each having a conical head on its inner end, and a cone bearing mounted on each bolt, said rotatably mounted balls being journaled on the inner ends of said bolts, said conical head and cone bearing forming bearings for said balls.

5. A shaft coupling comprising coupling members, links arranged between said members, adjustable bolts mounted in said coupling members, a universal connection between said bolts and each end of each link, and a jam nut mounted on one end of each bolt, each bolt having a conical head provided with a notch therein, said coupling members having apertures extending therethrough in alinement with said bolts, whereby said bolts may be adjusted with reference to the universal connection by means of tools inserted through said apertures.

6. A shaft coupling comprising coupling members, relatively short links arranged between said coupling members, all of the links being formed alike, a ball rotatably mounted in each end of each link, and bolts extending through each coupling member, alternate bolts extending through the coupling members and connecting with one of the balls of each link, each coupling member having apertures extending therethrough in alinement with said bolts, whereby the bolts may be adjusted or disconnected from the respective coupling members.

In testimony whereof I affix my signature.

BENJAMIN F. AUGUSTINE.